United States Patent
Itabashi

(10) Patent No.: US 11,643,089 B2
(45) Date of Patent: May 9, 2023

(54) VEHICLE CONTROL SYSTEM

(71) Applicant: TOYOTA JIDOSHA KABUSHIKI KAISHA, Toyota (JP)

(72) Inventor: Kaiji Itabashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 16/419,518

(22) Filed: May 22, 2019

(65) Prior Publication Data

US 2020/0070873 A1    Mar. 5, 2020

(30) Foreign Application Priority Data

Aug. 29, 2018   (JP) .............................. JP2018-160792

(51) Int. Cl.
*B60W 50/00*   (2006.01)
*B62D 5/04*    (2006.01)
(Continued)

(52) U.S. Cl.
CPC ......... *B60W 50/00* (2013.01); *B60R 16/0231* (2013.01); *B62D 5/0457* (2013.01);
(Continued)

(58) Field of Classification Search
None
See application file for complete search history.

(56) References Cited

U.S. PATENT DOCUMENTS

| 7,720,586 | B2 * | 5/2010 | Harumoto | B60W 40/12 |
| | | | | 701/48 |
| 2002/0016659 | A1 * | 2/2002 | Tashiro | B60W 30/1819 |
| | | | | 701/48 |

(Continued)

FOREIGN PATENT DOCUMENTS

| JP | 2005-199951 A | 7/2005 |
| JP | 2012-096618 A | 5/2012 |
| WO | 2005-068262 A1 | 7/2005 |

OTHER PUBLICATIONS

Yavuz and Bradshaw, A New Conceptual Approach to the Design of Hybrid Control Architecture for Autonomous Mobile Robots, 2002, Journal of Intelligent and Robotic Systems, pp. 1-26 (Year: 2002).*
International Standard ISO 11898-1, Road Vehicles—Controller area network (can)—Part 1: Data link layer and physical signalling, Dec. 1, 2003, ISO, pp. 5-25 (Year: 2003).*
Cheng, Design and application of SAE J1939 communication protocol in electric vehicle, Oct. 10, 2014, Journal of Networks, vol. 9, No. 10, pp. 2805-2812 (Year: 2014).*
Woo, CAN ID Shuffling Technique (CIST): Moving Target Defense Strategy for Protecting In-Vehicle CAN, Feb. 1, 2019, IEEE (Year: 2019).*

*Primary Examiner* — Christian Chace
*Assistant Examiner* — Scott R Jagolinzer
(74) *Attorney, Agent, or Firm* — Oliff PLC

(57) ABSTRACT

A vehicle control system includes a plurality of driving assistance devices configured to sequentially send request signals including requests to an actuator in the vehicle and identifiers of the driving assistance devices to an in-vehicle network, a movement manager device configured to acquire the request signals from the in-vehicle network, select one of the identifiers respectively included in the acquired request signals based on a predetermined rule, and sequentially send a control signal including at least the selected identifier to the in-vehicle network, and an actuator control device configured to sequentially acquire the request signal and the control signal from the in-vehicle network, when the control signal is acquired, select a latest request signal including the identifier included in the acquired latest control signal among the acquired request signals, and decide a control value of the actuator based on the request included in the selected request signal.

5 Claims, 5 Drawing Sheets

(51) Int. Cl.
*B60R 16/023* (2006.01)
*B62D 15/02* (2006.01)
*B60W 30/06* (2006.01)
*B60W 30/12* (2020.01)

(52) U.S. Cl.
CPC ............ *B60W 30/06* (2013.01); *B60W 30/12* (2013.01); *B60W 2050/0045* (2013.01); *B60W 2050/0094* (2013.01); *B62D 15/0285* (2013.01)

(56) References Cited

U.S. PATENT DOCUMENTS

| | | | |
|---|---|---|---|
| 2006/0064215 A1* | 3/2006 | Turski | B60W 50/06 701/41 |
| 2007/0150118 A1* | 6/2007 | Takamatsu | B60W 10/18 701/1 |
| 2011/0066344 A1* | 3/2011 | Niwa | B60W 10/06 701/70 |
| 2012/0109414 A1 | 5/2012 | Kumabe et al. | |
| 2012/0203424 A1* | 8/2012 | Filev | B60W 50/00 701/36 |
| 2018/0063246 A1* | 3/2018 | Vangelov | H04L 12/40013 |
| 2018/0234498 A1* | 8/2018 | Sangameswaran | H04L 12/4625 |
| 2019/0367041 A1* | 12/2019 | Nakano | B60W 30/18 |

* cited by examiner

VEHICLE CONTROL SYSTEM

INCORPORATION BY REFERENCE

The disclosure of Japanese Patent Application No. 2018-160792 filed on Aug. 29, 2018 including the specification, drawings and abstract is incorporated herein by reference in its entirety.

BACKGROUND

1. Technical Field

The present disclosure relates to a vehicle control system that controls a vehicle.

2. Description of Related Art

A driving assistance device that is mounted in a vehicle and performs various kinds of driving assistance has become widespread. The driving assistance device acquires information representing a state of movement or the like of the vehicle or a state of an object or the like around the vehicle from a sensor in the vehicle, calculates a request value for vehicle control, such as drive power, braking force, or a steering angle for implementing various kinds of driving assistance, and outputs a request signal including the request value. Each actuator control device that controls a corresponding actuator, such as an engine, a brake, or a steering of the vehicle, controls the actuator based on the request signal.

The driving assistance function is enhanced, and a plurality of driving assistance devices that executes driving assistance processing for each function, such as collision avoidance, lane keeping, or automatic parking, is mounted in the vehicle. When the driving assistance devices are mounted, the driving assistance devices may operate simultaneously, and may output request signals including different request values according to the functions.

Japanese Unexamined Patent Application Publication No. 2005-199951 (JP 2005-199951 A) discloses a configuration in which a movement manager device as an intermediate processing device is provided between a driving assistance device and each actuator control device. It is considered that such a movement manager device is given a function of selecting a request signal from any driving assistance device among request signals from the driving assistance devices and outputting the selected request signal to each actuator control device.

SUMMARY

When the movement manager device having the arbitration function described above is provided, a time from when the request signal is output from the driving assistance device until the request signal is received by the actuator control device includes a communication time between the driving assistance device and the movement manager device, a processing time of the arbitration function in the movement manager device, and a communication time between the movement manager device and the actuator control device. The communication time between the driving assistance device and the movement manager device at the first time is the same as a time of direct communication between the driving assistance device and the actuator control device. For this reason, the movement manager device is provided, whereby times to be increased are the processing time of the arbitration function at the second time and the communication time between the movement manager device and the actuator control device at the third time. In this way, the movement manager device is provided, whereby there is a possibility that a delay amount of the request signal increases and responsiveness improvement of the driving assistance function becomes difficult.

The disclosure provides a vehicle control system capable of suppressing an influence on responsiveness of a driving assistance function even though a plurality of driving assistance devices is provided.

An aspect of the disclosure relates to a vehicle control system that performs driving assistance of a vehicle. The vehicle control system includes a plurality of driving assistance devices, a movement manager device, and an actuator control device. The driving assistance devices are configured to sequentially send request signals including requests to an actuator in the vehicle and identifiers of the driving assistance devices to an in-vehicle network. The movement manager device is configured to acquire the request signals from the in-vehicle network, select one of the identifiers respectively included in the acquired request signals based on a predetermined rule, and send a control signal including at least the selected identifier to the in-vehicle network. The actuator control device is configured to sequentially acquire the request signal and the control signal from the in-vehicle network, when the control signal is acquired, select a latest request signal including the identifier included in the acquired latest control signal among the request signals acquired after acquiring the control signal, and decide a control value of the actuator based on the request included in the selected request signal.

In the vehicle control system according to the aspect, the request signal that the actuator control device acquires after acquiring the control signal from the in-vehicle network may not pass through the movement manager device.

In the vehicle control system according to the aspect, the movement manager device may select one of the identifiers respectively included in the acquired request signals based on the predetermined rule according to at least one of a driving state of the vehicle, a priority of a driving assistance function, and a content of each of the request signals.

In the vehicle control system according to the aspect, the actuator control device may control an electric power steering as the actuator. The request signal may include a request for movement in a lateral direction of the vehicle.

In the vehicle control system according to the aspect, the actuator control device may make the control value of the actuator gradually coincide with a request value represented by the request included in the selected request signal.

According to the aspect of the disclosure, it is possible to provide a vehicle control system capable of suppressing an influence on responsiveness improvement of a driving assistance function even though a plurality of driving assistance devices is provided.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiment

Figure 1:
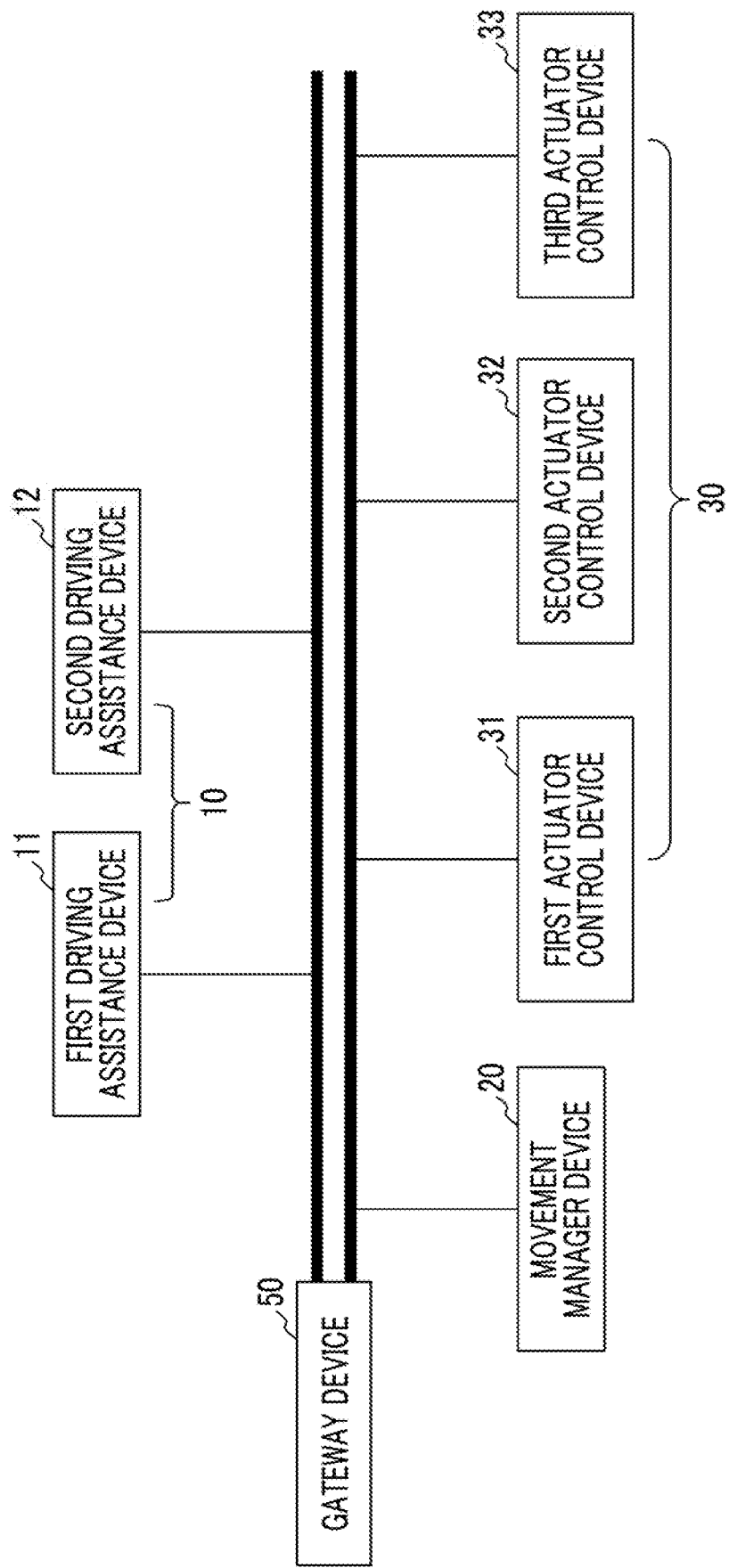
FIG. 1 is a functional block diagram of a vehicle control system according to an embodiment.

In a vehicle control system according to an embodiment, even though a plurality of driving assistance devices and a movement manager device as an intermediate processing device are provided, since a request value that is used for control in an actuator control device is acquired directly from each driving assistance device through single communication on an in-vehicle network, it is possible to suppress control delay compared to a case where the request value is acquired indirectly by way of the movement manager device through two times of communication on the in-vehicle network.

Hereinafter, an embodiment will be described in detail referring to the drawings.

Configuration

FIG. 1 is a functional block diagram of a vehicle control system 1 according to the embodiment. The vehicle control system 1 includes a first driving assistance device 11, a second driving assistance device 12, a movement manager device 20, a first actuator control device 31, a second actuator control device 32, and a third actuator control device 33. The devices are connected, for example, through an in-vehicle network, called a controller area network (CAN), and can send signals to the in-vehicle network or can acquire signals from the in-vehicle network. An aspect of the in-vehicle network is not limited, as shown in FIG. 1, and for example, an aspect in which a plurality of CANs is connected through a gateway device 50 may be made. Each of the signals sent to the in-vehicle network is attached with an identifier (CAN_ID) for specifying a device as a sending source, and each device can determine a device that sends the signal based on the identifier and can appropriately determine whether or not the signal is a signal to be acquired and processed by the device based on the identifier or another data included in the signal.

Each of the first driving assistance device 11 and the second driving assistance device 12 is an execution unit that executes an application for implementing a driving assistance function, such as autonomous driving of the vehicle. The first driving assistance device 11 and the second driving assistance device 12 acquire information representing a state of movement or the like of the vehicle or a state of an object or the like around the vehicle from sensors in the vehicle, calculate a value of at least one of drive power, braking force, a steering angle, and the like for implementing the functions of the first driving assistance device 11 and the second driving assistance device 12, set the calculated value to a request value representing a request to an actuator of the vehicle, generate a request signal including the request, and send the request signal to the in-vehicle network. The request value is, for example, a value that designates a steering angle or a radius of curvature representing movement in a lateral direction of the vehicle or an acceleration or force representing movement in a longitudinal direction (moving direction) of the vehicle, and a unit or a mechanical quantity of the request value is not particularly limited as long as an operation of the vehicle can be expressed with predetermined accuracy. Although the contents of the driving assistance functions of the first driving assistance device 11 and the second driving assistance device 12 are not limited, for example, the first driving assistance device 11 executes a lane keeping function of maintaining a traveling lane, and the second driving assistance device 12 executes an automatic parking function. The vehicle control system 1 may further include another driving assistance device as well as the first driving assistance device 11 and the second driving assistance device 12. The first driving assistance device 11, the second driving assistance device 12, and the other driving assistance device are collectively referred to or any one driving assistance device is referred to as a driving assistance device 10 simply.

The movement manager device 20 acquires, from the in-vehicle network, a request signal from the first driving assistance device 11, the second driving assistance device 12, or the other driving assistance device when the other driving assistance device is mounted. For example, when the request signals are acquired from a plurality of driving assistance devices 10 in a predetermined period, the movement manager device 20 selects any one request signal, generates a signal representing a selection result as a control signal, and sends the control signal to the in-vehicle network (arbitration processing). For example, when the request signal is acquired from one driving assistance device 10 in a predetermined period, the movement manager device 20 selects the request signal, generates a signal representing a selection result as a control signal, and sends the control signal to the in-vehicle network. The selection when a plurality of request signals is acquired can be performed, for example, according to a movement state of the vehicle, a priority of the driving assistance function, the contents of the request signals, or the like based on a predetermined rule. For example, when the vehicle that is traveling while operating the lane keeping function of the first driving assistance device 11 enters a parking section on a road side and performs a parking operation while operating the automatic parking function of the second driving assistance device 12, a period during which the first driving assistance device 11 operates and a period during which the second driving assistance device 12 operates may partially overlap each other. When a request signal for lane keeping generated by the first driving assistance device 11 and a request signal for the automatic parking function generated by the second driving assistance device 12 are acquired simultaneously, for example, the movement manager device 20 selects the first driving assistance device 11 when a vehicle speed is equal to or higher than a predetermined value, and selects the second driving assistance device 12 when the vehicle speed decreases to be lower than the predetermined value.

As an example, the first actuator control device 31, the second actuator control device 32, and the third actuator control device 33 are a steering control device that controls the steering (electric power steering) to perform steering, an engine (motor) control device that controls an engine or a motor to generate drive power or braking force, and a brake control device that controls a brake to generate a braking force, respectively. The first actuator control device 31, the second actuator control device 32, and the third actuator control device 33 can acquire the request signal generated by the first driving assistance device 11, the second driving assistance device 12, or the other driving assistance device when the other driving assistance device is mounted and the control signal generated by the movement manager device 20 from the in-vehicle network, and can control the steering, the engine (motor), and the brake based on the request signal and the control signal, respectively. The first actuator control device 31, the second actuator control device 32, and the third actuator control device 33 are collectively referred to or any one actuator control device is referred to as an actuator control device 30 simply.

Processing

Figure 2:
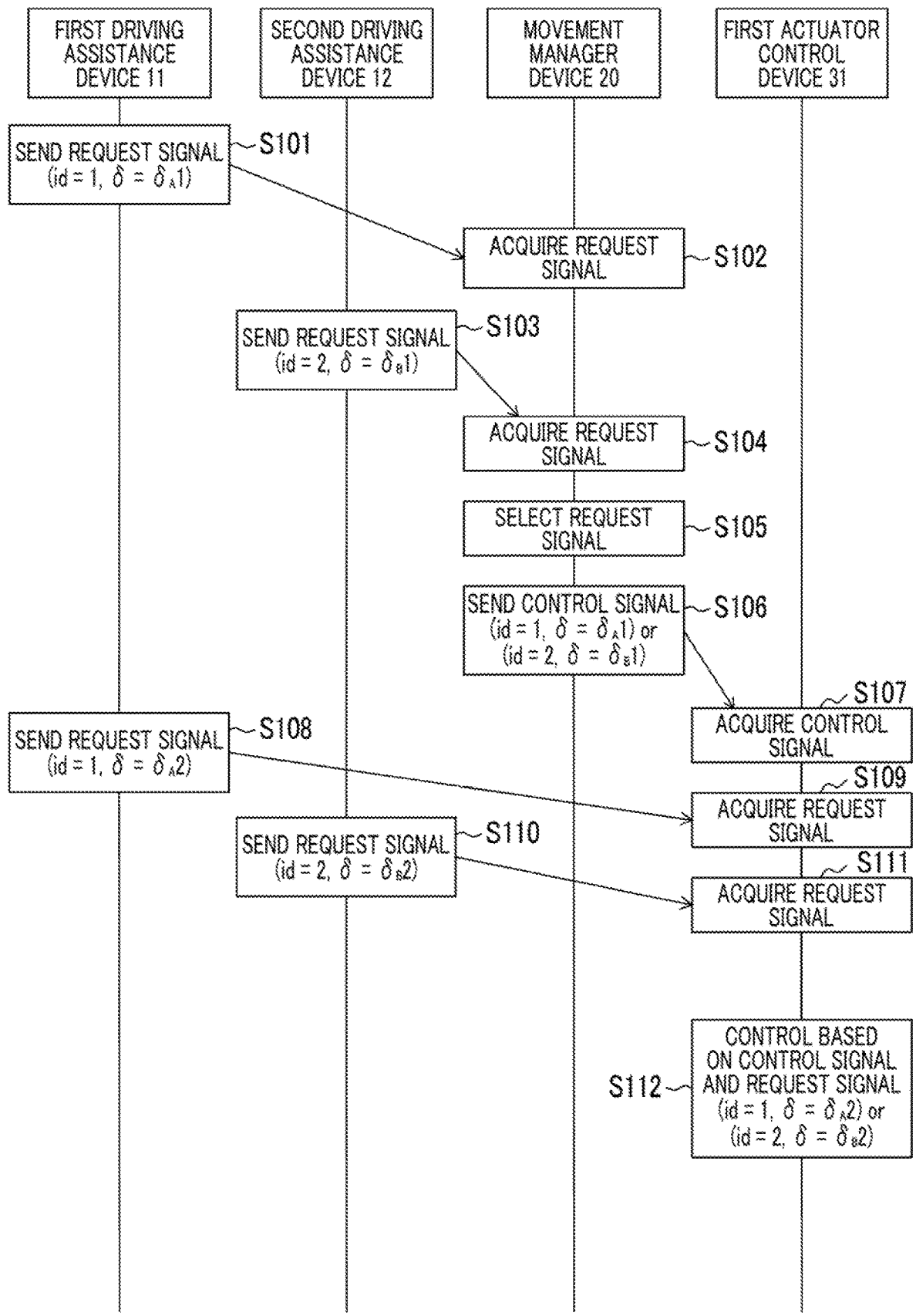
FIG. 2 is a sequence diagram showing processing according to the embodiment.

FIG. 2 is a sequence diagram showing an example of processing that is executed by the vehicle control system 1. An example of processing will be described referring to FIG. 2. In the processing, as an example, it is assumed that the first driving assistance device 11 and the second driving assistance device 12 send the request signals with a steering angle δ as a request value to a steering device as an example of requesting movement in a lateral direction substantially simultaneously and cyclically, and the first actuator control device 31 controls the steering according to the request signals and the like.

Step S101

The first driving assistance device 11 calculates a steering angle $δ=δ_A1$ as a request value, combines the request value and an identifier id=1 of the first driving assistance device 11 to generate a request signal, and sends the request to the in-vehicle network. The identifier id=1 is attached separately from an identifier, such as CAN_ID attached to the first driving assistance device 11 in the in-vehicle network, and may be different in value from CAN_ID.

Step S102

The movement manager device 20 acquires the request signal sent from the first driving assistance device 11I in Step S101 from the in-vehicle network. In FIG. 2, the correspondence between the sending of each signal and the acquisition of the signal is indicated by an arrow.

Step S103

The second driving assistance device 12 calculates a steering angle $δ=δ_B1$ as a request value, combines the request value and an identifier id=2 of the second driving assistance device 12 to generate a request signal, and sends the request signal to the in-vehicle network. The identifier id=2 is attached separately from an identifier, such as CAN_ID attached to the first driving assistance device 11 in the in-vehicle network, and may be different in value from CAN_ID.

Step S104

The movement manager device 20 acquires the request signal sent from the second driving assistance device 12 in Step S103 from the in-vehicle network.

Step S105

The movement manager device 20 selects any one of the request signal sent from the first driving assistance device 11 and acquired in Step S102 and the request signal sent from the second driving assistance device 12 and acquired in Step S104. This is synonymous as processing with selecting any one of the identifier id=1 included in the request signal sent from the first driving assistance device 11 and the identifier id=2 included in the request signal sent from the second driving assistance device 12. A selection method is not limited, and as described above, the selection can be performed based on a predetermined rule (arbitration policy) according to a movement state of the vehicle, a priority of the driving assistance function, a content of each request signal, or the like.

Step S106

The movement manager device 20 generates a control signal including at least the identifier selected in Step S105 and sends the control signal to the in-vehicle network. Although the control signal may include the identifier, and as an example, the movement manager device 20 generates a signal with the request signal selected between the request signal sent from the first driving assistance device 11 and the request signal sent from the second driving assistance device 12 attached with the identifier of the driving assistance device 10 sending the selected request signal and sends the signal to the in-vehicle network as the control signal.

Step S107

The first actuator control device 31 acquires the control signal sent from the movement manager device 20 in Step S106 from the in-vehicle network.

Step S108

The first driving assistance device 11 calculates a steering angle $δ=δ_A^2$ as a new request value, combines the request value and the identifier id=1 of the first driving assistance device 11 to generate a new request signal, and sends the generated request signal to the in-vehicle network.

The first actuator control device 31 acquires the request signal sent from the first driving assistance device 11 in Step S108 from the in-vehicle network. The first actuator control device 31 acquires the request signal that does not pass through the movement manager device.

Step S110

The second driving assistance device 12 calculates a steering angle $δ=δ_B2$ as a new request value, combines the request value and the identifier id=2 of the second driving assistance device 12 to generate a new request signal, and sends the generated request signal to the in-vehicle network.

Step S111

The first actuator control device 31 acquires the request signal sent from the second driving assistance device 12 in Step S110 from the in-vehicle network. The first actuator control device 31 acquires the request signal that does not pass through the movement manager device.

Step S112

The first actuator control device 31 refers to the identifier included in the control signal acquired in Step S107, and when the identifier is the identifier (id=1) of the first driving assistance device 11, executes control for setting a control value of the steering angle δ of the steering to $δ=δ_A2$ based on the request signal sent from the first driving assistance device 11 and acquired in Step S109.

When the identifier included in the control signal acquired in Step S107 is the identifier (id=2) of the second driving assistance device 12, the first actuator control device 31 executes control for setting the control value of the steering angle δ of the steering to $δ=δ_B2$ based on the request signal sent from the second driving assistance device 12 and acquired in Step S111.

The above processing is repeated and the same processing is executed on a new request signal. Though not shown in FIG. 2, the movement manager device 20 executes arbitration processing on the request signals sent in Steps S108 and S110 to generate and send a new control signal in the same manner that the arbitration processing of Steps S102, and S104 to S106 is executed on the request signals sent in Steps S101 and S103. Thereafter, when the first driving assistance device 11 and the second driving assistance device 12 send the new request signals, the first actuator control device 31 executes control based on any one of the new request signals according to the identifier of the control signal in the same manner as in Step S112. In this way, the first actuator control device 31 sequentially acquires the request signal and the control signal. When the control signal is acquired, the first actuator control device 31 selects a latest request signal including the identifier included in the acquired latest control signal among the request signals acquired after the acquisition of the control signal and decides a control value of the actuator based on the request included in the selected request signal.

With the above-described processing, the first actuator control device 31 executes control of the steering based on the control signal generated by the movement manager device 20 and the request signal selected from among the latest request signals acquired after the acquisition of the control signal. With this, control based on the request signal ((id=1, $\delta=\delta_A 2$) or (id=2, $\delta=\delta_B 2$)) sent to the in-vehicle network in Step S108 or S110 can be executed immediately after the first actuator control device 31 acquires the request signal in Step S111 with the lapse of a single communication time of the in-vehicle network (Step S112). In the processing, the request signal that is used when the movement manager device 20 generates the control signal is different from the request signal that is used when the first actuator control device 31 executes control according to the control signal. Note that, when the movement manager device 20 selects the request signal of any one driving assistance device 10, while a series of driving assistance functions is executed, in order to continue the selection of the request signals sent from the same driving assistance device 10 successively multiple times, in the processing, the first actuator control device 31 can actually execute control along the arbitration policy of the movement manager device 20. The first actuator control device 31 starts the control based on the request signal after the control signal is acquired. For this reason, for example, like the request signals sent in Steps S101 and S103 described above, even though the request signal is used for the arbitration processing, the request value included in the request signal may not be used as the control value of the actuator. This has no problem as described below, and can be addressed even though there is a problem. Even though the number of driving assistance devices 10 that send the request signals to the in-vehicle network is one or three or more, the movement manager device can select one request signal (one driving assistance device 10) and generate and send the control signal according to the selection result to execute the same processing. When the first actuator control device 31 is unable to acquire the request signal including the identifier having the same value as the identifier included in the control signal after the acquisition of the control signal, the control of the steering may not be particularly executed.

The request signal may include a request value of braking force or drive power in addition to the request value of the steering angle or instead of the request value of the steering angle, and in this case, as in the above-described steps, the second actuator control device 32 or the third actuator control device 33 appropriately executes the control of the engine (motor) or the brake based on the control signal generated by the movement manager device 20 and the request signal selected from the latest request signals generated by the driving assistance devices 10. When the request value represents braking force, for example, communication may be separately performed among the movement manager device 20, the second actuator control device 32, and the third actuator control device 33, and arbitration processing for appropriately distributing braking force to be generated between the engine (motor) and the brake may be executed.

Figure 3:
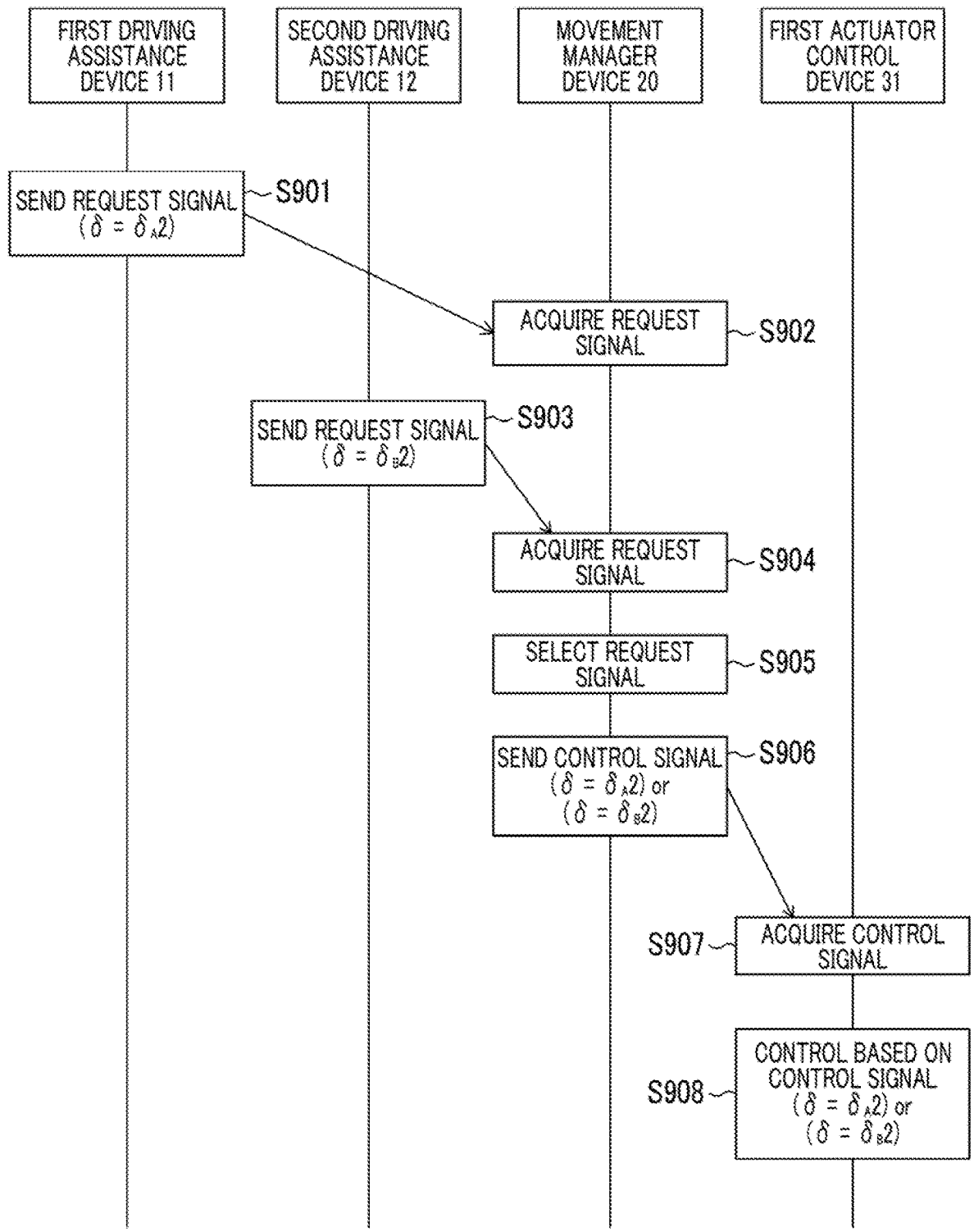
FIG. 3 is a sequence diagram showing processing according to a comparative example.

For comparison, an example of general processing when an intermediate processing device, such as the movement manager device 20 is provided will be described below. FIG. 3 is a sequence diagram showing an example of processing according to such a comparative example. Description of the sequence shown in FIG. 3 is started from processing corresponding to Step S108 in order to compare with the control based on the request signal ((id=1, $\delta=\delta_A 2$) or (id=2, $\delta=\delta_B 2$)) sent to the in-vehicle network in Step S108 or S110 described above.

Step S901

As in Step S108 described above, the first driving assistance device 11 calculates the steering angle $\delta=\delta_A 2$ as a request value, generates a request signal including the request value, and sends the request signal to the in-vehicle network.

Step S902

The movement manager device 20 acquires the request signal sent from the first driving assistance device 11 in Step S901 from the in-vehicle network. In FIG. 3, correspondence between the sending of each signal and the acquisition of the signal is indicated by an arrow.

Step S903

As in Step S110 described above, the second driving assistance device 12 calculates the steering angle $\delta=\delta_B 2$ as a request value, generates a request signal including the request value, and sends the request signal to the in-vehicle network.

Step S904

The movement manager device 20 acquires the request signal sent from the second driving assistance device 12 in Step S903 from the in-vehicle network.

Step S905

The movement manager device 20 selects any one of the request signal sent from the first driving assistance device 11 and acquired in Step S902 and the request signal sent from the second driving assistance device 12 and acquired in Step S904.

Step S906

The movement manager device 20 sends the request signal selected in Step S905 to the in-vehicle network as a control signal.

Step S907

The first actuator control device 31 acquires the control signal sent from the movement manager device 20 in Step S906 from the in-vehicle network.

Step S908

The first actuator control device 31 executes control for setting the steering angle $\delta$ of the steering to $\delta=\delta_A 2$ (or $\delta_B 2$) based on the request value included in the control signal acquired in Step S907. That is, the first actuator control device 31 sets the steering angle $\delta$ to $\delta=\delta_A 2$ when the request value is $\delta_A 2$, and sets the steering angle $\delta$ to $\delta=\delta_B 2$ when the request value is $\delta_B 2$.

The above processing is repeated, and the same processing is executed on a new request signal. In the comparative example, the control based on the request signal (($\delta=\delta_A 2$) or ($\delta=\delta_B 2$)) sent to the in-vehicle network in Step S901 or S903 is executed after the first actuator control device 31 acquires the control signal in Step S907 with the lapse of a communication time for two times of the in-vehicle network and a time needed for the arbitration processing in the movement manager device 20 (Step S908).

Figure 4A:
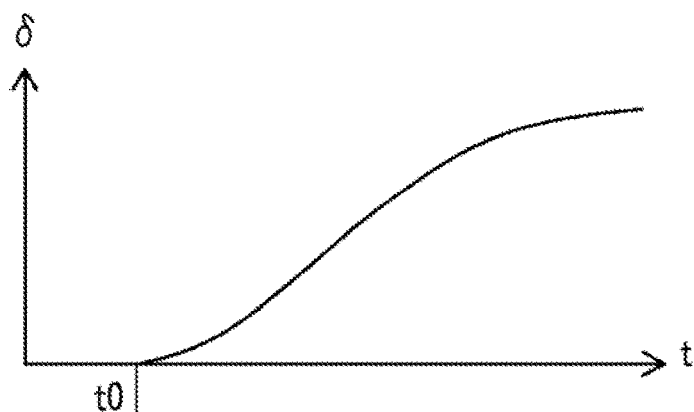
FIG. 4A is a graph showing a control timing in the processing according to the embodiment and the processing according to the comparative example.

FIGS. 4A to 4D are graphs showing an example of an error between control timings in the processing according to the embodiment and the processing according to the comparative example. In FIGS. 4A to 4D, the horizontal axis is taken as a time, and the vertical axis is taken as a request value included in a request signal or a control signal. In FIG. 4A, the request value of the request signal that the first driving assistance device 11 sends to the in-vehicle network is shown. It is assumed that the first driving assistance device 11 starts to send the request signal at time t=t0. In FIGS. 4A to 4D, although the request value is shown with a continuous line, actually, the request value is a discrete value that is calculated at a given time interval. In the example shown in FIGS. 4A to 4D, it is assumed that, in both of the embodiment and the comparative example, the movement manager device 20 selects the request signal of the first driving assistance device 11.

Figure 4B:
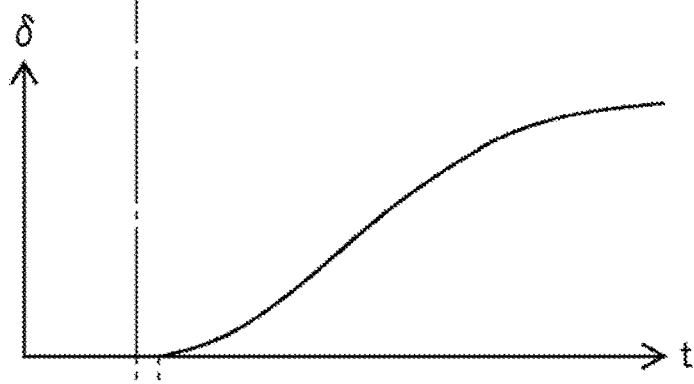
FIG. 4B is a graph showing a control timing in the processing according to the embodiment and the processing according to the comparative example.

In FIG. 4B, the request value of the request signal of the first driving assistance device 11 that the movement manager device 20 acquires from the in-vehicle network is shown. The request value is delayed by a communication time t1 of the in-vehicle network compared to FIG. 4A. The same applies in the embodiment and the comparative example.

Figure 4C:
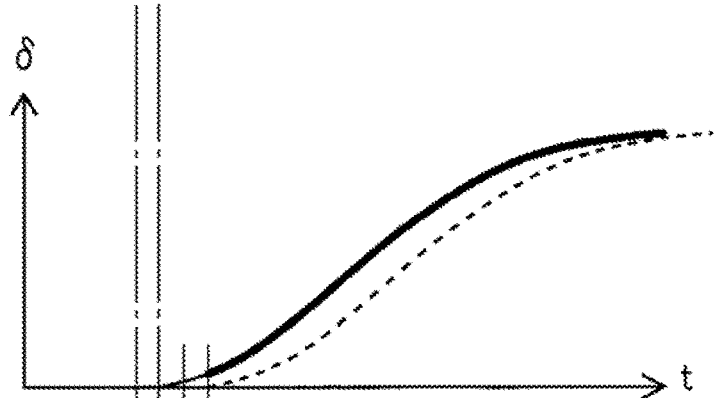
FIG. 4C is a graph showing a control timing in the processing according to the embodiment and the processing according to the comparative example.

In FIG. 4C, the request value of the request signal of the first driving assistance device 11 that the first actuator control device 31 acquires from the in-vehicle network in the embodiment is shown with a solid line. The request value is delayed by the communication time t1 of the in-vehicle network compared to FIG. 4A. The request value of the control signal from the movement manager device 20 that the first actuator control device 31 acquires from the in-vehicle network is shown with a dotted line. The request value is delayed by the communication time t1 of the in-vehicle network, a time t2 needed for the selection processing of the request signal in the movement manager device 20, and a communication time t3 of the in-vehicle network compared to FIG. 4A. In the solid line, the request value that the first actuator control device 31 actually uses for the control is shown with a heavy line. Since the first actuator control device 31 executes the control using the request value shown with the solid line based on the identifier included in the control signal, the first actuator control device 31 starts the control after the acquisition of the control signal. That is, although a control start time is delayed by the time t1+t2+t3 from time t=t0, the delay of the request value itself to be used for the control is suppressed to t1. The delay time t1 of the request value is the same as the delay when the movement manager device 20 is not provided as an intermediate processing device. In general, the time t2 needed for the selection processing of the request signal in the movement manager device 20 is actually shorter than that shown in the drawing compared to the communication time t1, t3 of the in-vehicle network. In this way, in the embodiment, even though the movement manager device 20 is provided, the delay of the request value to be used for the control is suppressed, and hardly affects the responsiveness of the driving assistance function.

Figure 4D:
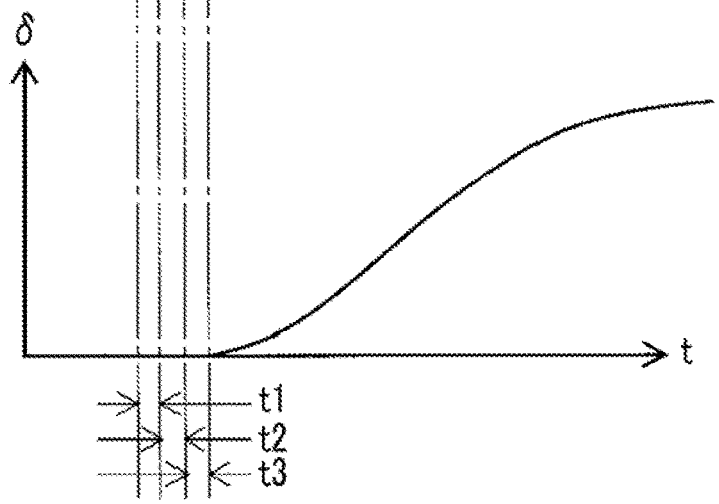
FIG. 4D is a graph showing a control timing in the processing according to the embodiment and the processing according to the comparative example.

In FIG. 4D, the request value of the control signal from the movement manager device 20 that the first actuator control device 31 acquires from the in-vehicle network in the comparative example is shown. The request value is delayed by the communication time t1 of the in-vehicle network, the time t2 needed for the selection processing of the request signal in the movement manager device 20, and the communication time t3 of the in-vehicle network compared to FIG. 4A. Since the first actuator control device 31 executes the control using the request value included in the control signal, the first actuator control device 31 starts the control after the acquisition of the control signal. That is, in the comparative example, the control start time is delayed by the time t1+t2+t3 from time t=t0, and the request value to be used for the control is also delayed by the time t1+t2+t3.

Figure 5A:
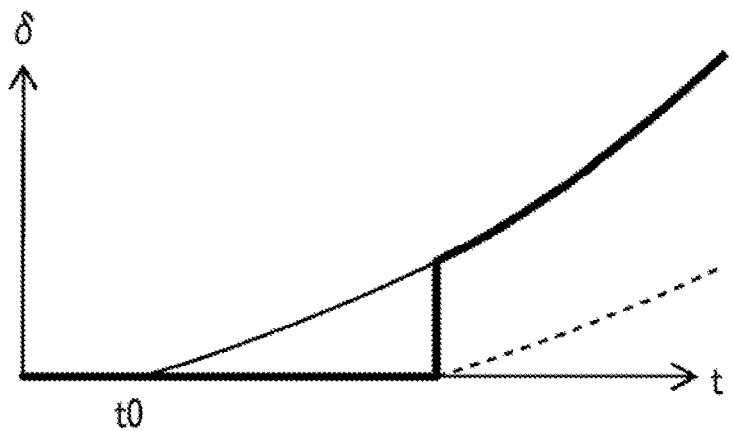
FIG. 5A is a graph showing an example of change of a control value in the processing according to the embodiment.

As described above, in the embodiment, the actuator control device 30 starts the control based on the request signal from the driving assistance device 10 after the acquisition of the control signal from the movement manager device 20. For this reason, the control based on the request signal is not executed, for example, immediately after the driving assistance device 10 starts driving assistance processing. In FIG. 5A, a partially enlarged graph of FIG. 4C is shown, and an example of a control value of an actuator immediately before the control based on the request signal from the driving assistance device 10 is started is further shown with a heavy line. As shown in FIG. 5A, a discontinuous change may occur between the control value of the actuator immediately before the control based on the request signal from the driving assistance device 10 is started and a control value of the actuator immediately after the control based on the request signal is started.

Figure 5B:
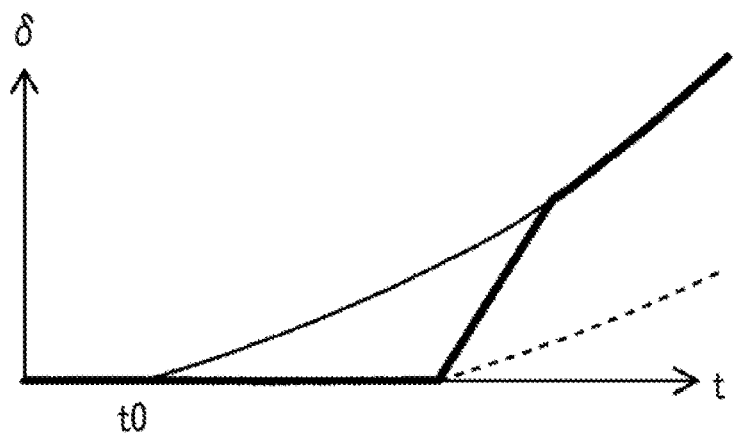
FIG. 5B is a graph showing an example of change of the control value in the processing according to the embodiment.
Figure 5C:
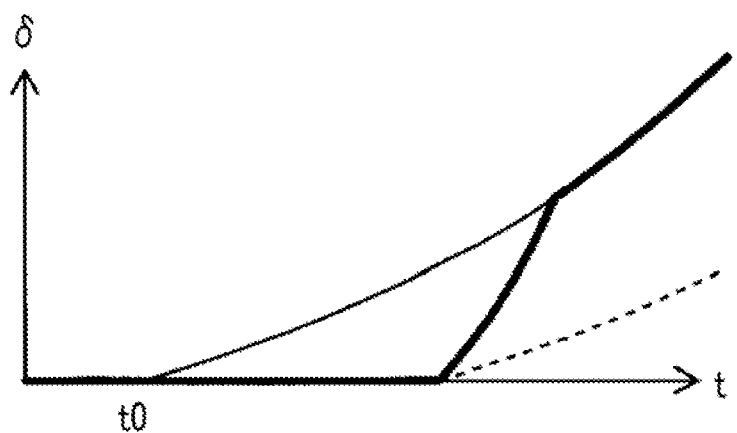
FIG. 5C is a graph showing an example of change of the control value in the processing according to the embodiment.

When a change amount is comparatively small, since the operation of the vehicle is not suddenly change, there is no problem in particular. Even though the change amount is comparatively large, this is because, to begin with, the driving assistance device suddenly changes the request value in a short time to meet the purpose of driving assistance. From this, it can be considered that there is no problem even though a sudden change in the operation of the vehicle occurs. However, in order to suppress a significant sudden change in the operation of the vehicle, the actuator control device 30 may make the control value coincide with the request value while bringing the control value gradually close to the request value, thereby suppressing a time rate of change of the control value while the difference between the current control value and the request value is equal to or greater than a predetermined value. FIGS. 5B and 5C show an example where correction is made to suppress the time rate of change of the control value shown in FIG. 5A. In the example shown in FIG. 5B, a gradient of change of the control value is set to a constant equal to or less than a predetermined value, and the control value is made to gradually coincide with the request value while restricting the gradient. In the example shown in FIG. 5C, the control value is made to follow the request value with a time difference. The time difference may be set to be gradually smaller, for example. Even when a plurality of request signals acquired in a previous predetermined period until the control signal is acquired is stored, and a change pattern of the control value is generated based on a pattern obtained by reproducing a change pattern of the request values in a period shorter than the predetermined period, it is possible to make the control value gradually coincide with the request value. In this way, when the control value is made to gradually coincide with the request value, it is possible to suppress a significant sudden change in the operation of the vehicle. A method of making the control value gradually coincide with the request value is not limited to the above-described example, and other general methods can be appropriately selected.

Effects

In the embodiment, even though there is a plurality of driving assistance devices, the request value that the actuator control device uses for the control is acquired directly from each driving assistance device through single communication on the in-vehicle network, it is possible to suppress control delay compared to when the request value is acquired indirectly by way of the movement manager device as an intermediate processing device through communication of two times on the in-vehicle network. This means that, when feedback control is executed, it is possible to increase a control gain with suppression of a wasteful time in a control system. With this, response performance of actuator control is improved.

The control in the lateral direction of the vehicle, such as the steering, generally needs high response performance to implement a desired vehicle operation compared to control in a longitudinal direction (moving direction) of the vehicle, such as braking force or drive power. For this reason, the aspect of the disclosure is effective for application to the control of the steering in particular. The aspect of the disclosure may also be applied to control of braking force or drive power of an actuator of the engine (motor), the brake, or the like. In this way, the aspect of the disclosure can be applied to control of a part of a plurality of actuators. In this case, for example, the processing according to the comparative example described above may be applied to control of other actuators.

A mounting aspect of the functional blocks shown in FIG. 1 is not limited. For example, the movement manager device may be integrated with any one actuator control device. In such a case, since communication on the in-vehicle network is not performed and delay is small between the movement manager device and the actuator control device in which the movement manager device is integrated, actuator control of the actuator control device has little difference in response performance between when the aspect of the disclosure is applied and when the above-described comparative example is applied, and any of the aspect of the disclosure and the comparative example may be applied.

Although the embodiment has been described, the aspect of the disclosure can be regarded as a vehicle control system, a vehicle control method that is executed by a computer of each unit of the vehicle control system, a vehicle control program, a non-transitory computer-readable recording medium storing the vehicle control program, a vehicle, and the like.

The aspect of the disclosure is useful for a vehicle control system that is mounted in a vehicle or the like.

What is claimed is:

1. A vehicle control system that performs driving assistance of a vehicle, the vehicle control system comprising:
   a plurality of driving assistance devices configured to send request signals including requests to an actuator in the vehicle and identifiers of the driving assistance devices, to an in-vehicle network;
   a movement manager device configured to acquire the request signals from the in-vehicle network, select one of the acquired request signals based on a predetermined rule, and send a control signal including at least the identifier included in the request signals selected to the in-vehicle network; and
   an actuator control device configured to
      acquire the control signal from the movement manager device through the in-vehicle network and thereafter acquire the request signals from the plurality of driving assistance devices respectively, and
      determine a control value for the actuator based on an acquired request signal including an identifier corresponding to the identifier included in the acquired control signal.

2. The vehicle control system according to claim 1, wherein the request signal that the actuator control device acquires after acquiring the control signal from the in-vehicle network does not pass through the movement manager device.

3. The vehicle control system according to claim 1, wherein the movement manager device selects one of the identifiers respectively included in the acquired request signals based on the predetermined rule according to at least one of a driving state of the vehicle, a priority of a driving assistance function, and a content of each of the request signals.

4. The vehicle control system according to claim 1, wherein:
   the actuator control device controls an electric power steering as the actuator; and
   the request signal includes a request for movement in a lateral direction of the vehicle.

5. The vehicle control system according to claim 1, wherein the actuator control device makes the control value of the actuator gradually coincide with a request value represented by the request included in the request signal selected by maintaining a rate of change of the control value to be equal to or smaller than a predetermined value during a period in which a difference between the control value and the request value is equal to or greater than a predetermined difference.

* * * * *